(12) United States Patent
Bolivar

(10) Patent No.: US 8,195,683 B2
(45) Date of Patent: Jun. 5, 2012

(54) EXPANSION OF DATABASE SEARCH QUERIES

(75) Inventor: Alvaro Bolivar, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 800 days.

(21) Appl. No.: 11/363,679

(22) Filed: Feb. 28, 2006

(65) Prior Publication Data

US 2007/0203929 A1 Aug. 30, 2007

(51) Int. Cl.
G06F 17/30 (2006.01)
G06F 17/00 (2006.01)

(52) U.S. Cl. ........ 707/765; 707/766; 707/768; 707/769; 704/270; 704/257; 706/45

(58) Field of Classification Search .................. 707/1–6, 707/10, 740, 748–749, 688, 780, 736, 713, 707/765–769; 706/45; 714/47; 704/270, 704/257

See application file for complete search history.

(56) References Cited

U.S. PATENT DOCUMENTS

| | | | |
|---|---|---|---|
| 5,278,980 A | | 1/1994 | Pedersen et al. |
| 5,424,947 A * | | 6/1995 | Nagao et al. ...................... 704/9 |
| 5,717,913 A | | 2/1998 | Driscoll |
| 5,926,811 A * | | 7/1999 | Miller et al. ...................... 707/5 |
| 6,012,153 A * | | 1/2000 | Brink et al. ...................... 714/47 |
| 6,081,774 A | | 6/2000 | de Hita et al. |
| 6,246,977 B1 * | | 6/2001 | Messerly et al. .................. 704/9 |
| 6,411,950 B1 * | | 6/2002 | Moricz et al. ...................... 707/3 |
| 6,598,039 B1 * | | 7/2003 | Livowsky ......................... 707/3 |
| 6,854,035 B2 | | 2/2005 | Dunham et al. |
| 6,941,293 B1 | | 9/2005 | Dean et al. |
| 7,120,574 B2 * | | 10/2006 | Troyanova et al. ............... 704/9 |
| 7,124,129 B2 * | | 10/2006 | Bowman et al. .................. 707/5 |
| 7,246,129 B2 * | | 7/2007 | Lawrence et al. ..................... 1/1 |
| 7,287,025 B2 * | | 10/2007 | Wen et al. ......................... 707/5 |
| 7,330,811 B2 * | | 2/2008 | Turcato et al. .................. 704/10 |
| 7,630,986 B1 | | 12/2009 | Herz et al. |
| 2001/0000356 A1 | | 4/2001 | Woods |
| 2001/0037325 A1 | | 11/2001 | Biderman et al. |
| 2002/0049752 A1 | | 4/2002 | Bowman et al. |
| 2003/0041058 A1 | | 2/2003 | Ibuki et al. |
| 2003/0069877 A1 | | 4/2003 | Grefenstette et al. |

(Continued)

FOREIGN PATENT DOCUMENTS

WO WO-2007100812 A2 9/2007

(Continued)

OTHER PUBLICATIONS

"U.S. Appl. No. 11/238,643 Final Office Action mailed Oct. 15, 2010", 21 pgs.

(Continued)

*Primary Examiner* — Yicun Wu

(74) *Attorney, Agent, or Firm* — Schwegman, Lundberg & Woessner, P.A.

(57) ABSTRACT

In some embodiments, a method includes receiving a token that is usable in search queries for data in a database. The database includes items of data that are represented by data strings. The method also includes determining a synonym candidate for the token. The method includes adding the synonym candidate as a synonym for the token into an expansion dictionary in response to a determination that the number of data strings having the synonym candidate exceeds a threshold.

14 Claims, 9 Drawing Sheets

U.S. PATENT DOCUMENTS

| | | |
|---|---|---|
| 2003/0069880 A1 | 4/2003 | Harrison et al. |
| 2003/0182422 A1 | 9/2003 | Bradshaw et al. |
| 2004/0194141 A1 | 9/2004 | Sanders |
| 2004/0230572 A1 | 11/2004 | Omoigui |
| 2004/0243560 A1 | 12/2004 | Broder et al. |
| 2004/0243645 A1 | 12/2004 | Broder et al. |
| 2005/0004889 A1 | 1/2005 | Bailey et al. |
| 2005/0022114 A1 | 1/2005 | Shanahan et al. |
| 2005/0050030 A1 | 3/2005 | Gudbjartsson et al. |
| 2005/0055342 A1 | 3/2005 | Bharat et al. |
| 2005/0065811 A1 | 3/2005 | Chu et al. |
| 2005/0065920 A1 | 3/2005 | He et al. |
| 2005/0086205 A1 | 4/2005 | Franciosa et al. |
| 2005/0108200 A1 | 5/2005 | Meik et al. |
| 2005/0131872 A1 | 6/2005 | Calbucci |
| 2005/0154690 A1 | 7/2005 | Nitta et al. |
| 2005/0210008 A1 | 9/2005 | Tran et al. |
| 2005/0210383 A1 | 9/2005 | Cucerzan et al. |
| 2005/0289168 A1 | 12/2005 | Green et al. |
| 2006/0036503 A1 | 2/2006 | Schweier et al. |
| 2006/0265391 A1 | 11/2006 | Posner et al. |

FOREIGN PATENT DOCUMENTS

| | | |
|---|---|---|
| WO | WO-2007100812 A3 | 9/2007 |

OTHER PUBLICATIONS

"U.S. Appl. No. 11/238,643, Advisory Action mailed Dec. 21, 2009", 3 pgs.

"U.S. Appl. No. 11/238,643, Final Office Action mailed Oct. 7, 2009", 20 pgs.

"U.S. Appl. No. 11/238,643, Non-Final Office Action mailed Mar. 3, 2009", 18 pgs.

"U.S. Appl. No. 11/238,643, Non-Final Office Action mailed Mar. 11, 2010", 23 pgs.

"U.S. Appl. No. 11/238,643, Response filed Jun. 9, 2009 to Non Final Office Action mailed Mar. 9, 2009", 24 pgs.

"U.S. Appl. No. 11/238,643, Response filed Jul. 12, 2010 to Non Final Office Action mailed Mar. 11, 2010", 19 pgs.

"U.S. Appl. No. 11/238,643, Response filed Dec. 7, 2009 to Final Office Action mailed Oct. 7, 2009", 23 pgs.

"Chinese Application Serial No. 200780015514.2, Office Action Mailed Nov. 6, 2009", 3 pgs.

"European Application Serial No. 07751791.0, Search report mailed Nov. 24, 2009", 3 pgs.

"U.S. Appl. No. 11/238,643, Non Final Office Action mailed Apr. 5, 2011", 23 pgs.

"U.S. Appl. No. 11/238,643, Response filed Jan. 14, 2011 to Final Office Action mailed Oct. 15, 2010", 21 pgs.

"Chinese Application Serial No. 200780015514.2, Response filed Mar. 22, 2010", 10 pgs.

"European Application Serial No. 07751791.0, Examiner Notification mailed Feb. 1, 2011", 7 pgs.

"International Application Serial No. PCT/US2007/005057, International Preliminary Report on Patentability mailed Sep. 12, 2008", 6 pgs.

"International Application Serial No. PCT/US2007/005057, International Search Report and Written Opinion mailed Feb. 7, 2008", 11 pgs.

"U.S. Appl. No. 11/238,643, Final Office Action mailed Sep. 28, 2011", 25 pgs.

"U.S. Appl. No. 11/238,643, Pre-Appeal Brief Request for Review filed Jan. 13, 2012", 5 pgs.

"U.S. Appl. No. 11/238,643, Response filed Jul. 5, 2011 to Non Final Office Action mailed Apr. 5, 2011", 19 pgs.

"Chinese Application Serial No. 200780015514.2—Office Action Response filed Aug. 22, 2011", 9 pgs.

"Chinese Application Serial No. 200780015514.2, Office Action mailed Oct. 28, 2011", w/ English Translation, 11 pgs.

"Chinese Application Serial No. 200780015514.2. Office Action received Jun. 7, 2011", 6 pgs.

"Chinese Application Serial No. 200780015514.2, Office Action Response filed Jan. 5, 2012", 8 pgs.

"European Application Serial No. 07751791.0, Office Action Response", 17 pgs.

\* cited by examiner

EXPANSION OF DATABASE SEARCH QUERIES

TECHNICAL FIELD

The application relates generally to databases. In particular, the application relates to an expansion of a database search query.

BACKGROUND

A search engine is a tool that identifies data items in a data source based on a data search query that may be entered by a user. The search engine uses different tokens in the search query (such as words or phrases) to identify data items that are of interest to the user. Sometimes a search engine returns search results that include too many or not enough data items because the data search query is too broad or narrow, respectively.

SUMMARY

In some embodiments, a method includes receiving a token that is usable in search queries for data in a database. The database includes items of data that are represented by data strings. The method also includes determining a synonym candidate for the token. The method includes adding the synonym candidate as a synonym for the token into an expansion dictionary in response to a determination that the number of data strings having the synonym candidate exceeds a threshold.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings.

DETAILED DESCRIPTION

Methods, apparatus and systems for expansion of database search queries are described. In the following description, numerous specific details are set forth. However, it is understood that embodiments of the invention may be practiced without these specific details. In other instances, well-known circuits, structures and techniques have not been shown in detail in order not to obscure the understanding of this description.

This description of the embodiments is divided into four sections. The first section describes an example system environment. The second section describes operations for search query expansion. The third section describes an example computer apparatus. The fourth section provides some general comments.

Example System Environment

Figure 1:
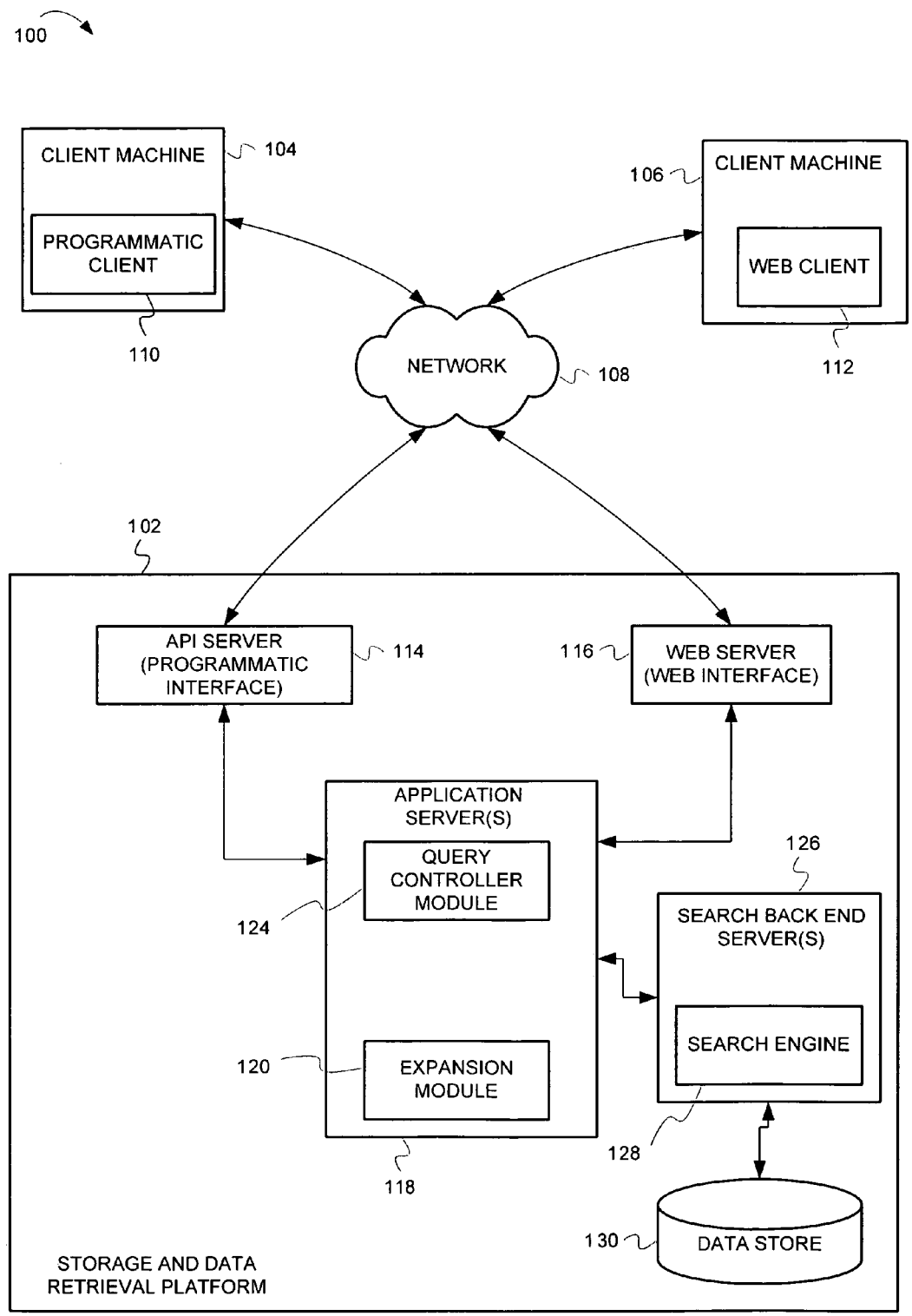
FIG. 1 illustrates a system for database search expansion, according to some embodiments of the invention.

FIG. 1 illustrates a system for database search expansion, according to some embodiments of the invention. FIG. 1 illustrates a system 100 having a client-server architecture. A platform, in the example form of an information storage and retrieval platform 102, provides server-side functionality, via a network 108 (e.g., the Internet) to one or more clients. FIG. 1 illustrates, for example, a web client 112 (e.g., a web browser), and a programmatic client 110 executing on a client machine 106 and 104, respectively.

Turning specifically to the information storage and retrieval platform 102, an application program interface (API) server 114 and a web server 116 are coupled to, and provide programmatic and web interfaces respectively to, one or more application servers 118. The application servers 118 may host a query controller module 124, and an expansion module 120. The application servers 118 are, in turn, shown to be coupled to one or more search back end servers 126. The search back end servers 126 host a search engine 128 and facilitates access to a data store 130 (which may store one of more databases).

The query controller module 124 acts a hub between the client machines 104 and 106 and the other search modules (e.g., the expansion module 120). To this end the query controller module 124 communicates via the API server 114 and the web server 116 with the client machines 104 and 106, respectively, and communicates directly with the other search modules.

While the system 100 shown in FIG. 1 employs a client-server architecture, embodiments are not limited to such an architecture, and could equally well find application in a distributed, or peer-to-peer, architecture system. The expansion module 120, the query controller module 124 and the search engine 128 may be representative of hardware, firmware or a combination thereof. In some embodiments, the expansion module 120, the query controller module 124 and the search engine 128 may be implemented as standalone software programs, which do not necessarily have networking capabilities.

The web client 112 accesses the various services and functions provided by search modules via the web server 116 supported by the web server 116. Similarly, the programmatic client 110 accesses the various services and functions provided by the search modules via the programmatic interface provided by the API server 114.

Operations for Search Query Expansion

This section provides a description of operations for search query expansion, according to some embodiments of the invention. In certain embodiments, the operations are performed by instructions residing on machine-readable media (e.g., software), while in other embodiments, the methods are performed by hardware or other logic (e.g., digital logic).

Figure 2:
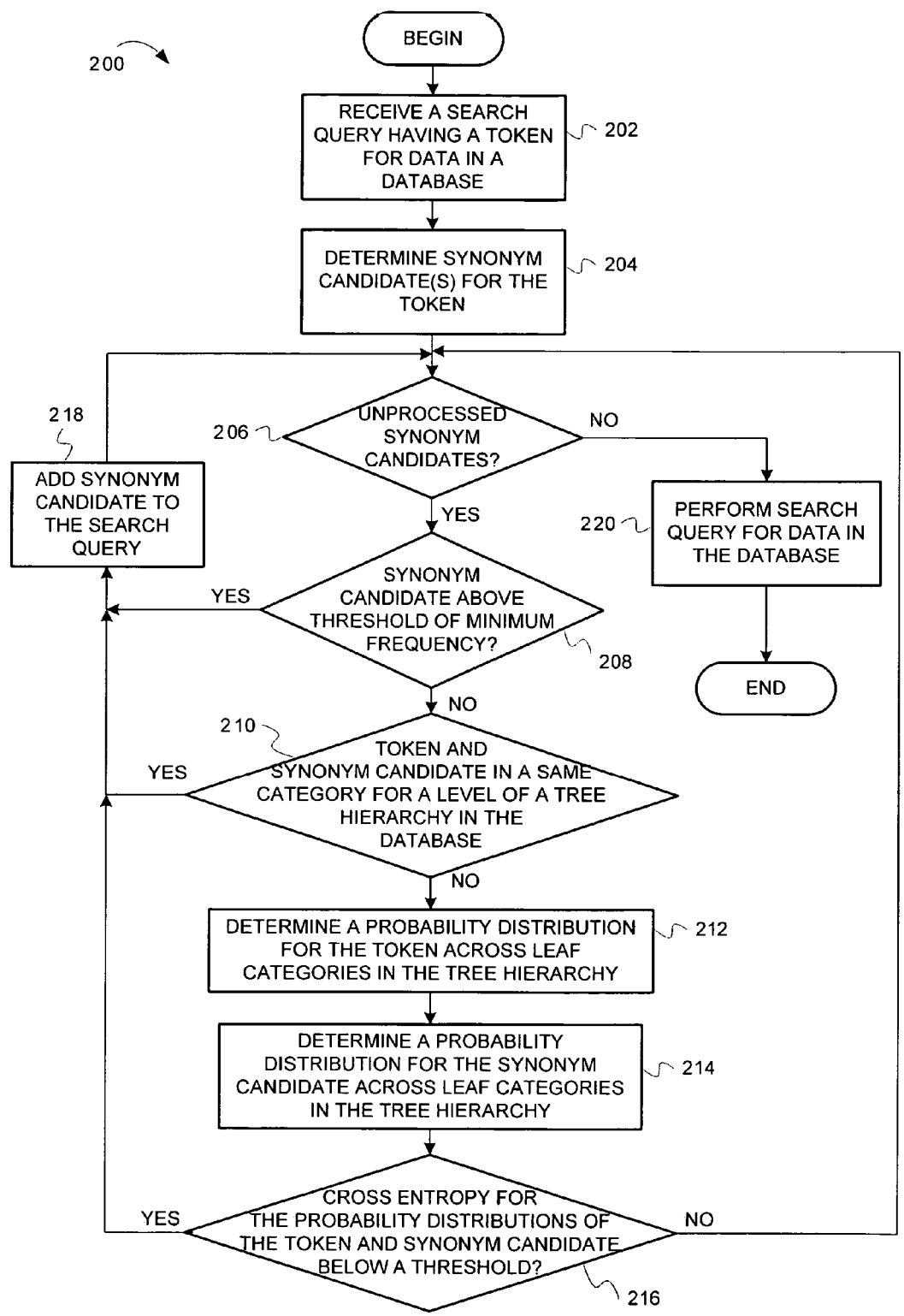
FIG. 2 illustrates a flow diagram for a search query that includes a search query expansion as part of the search query, according to some embodiments of the invention.
Figure 5:
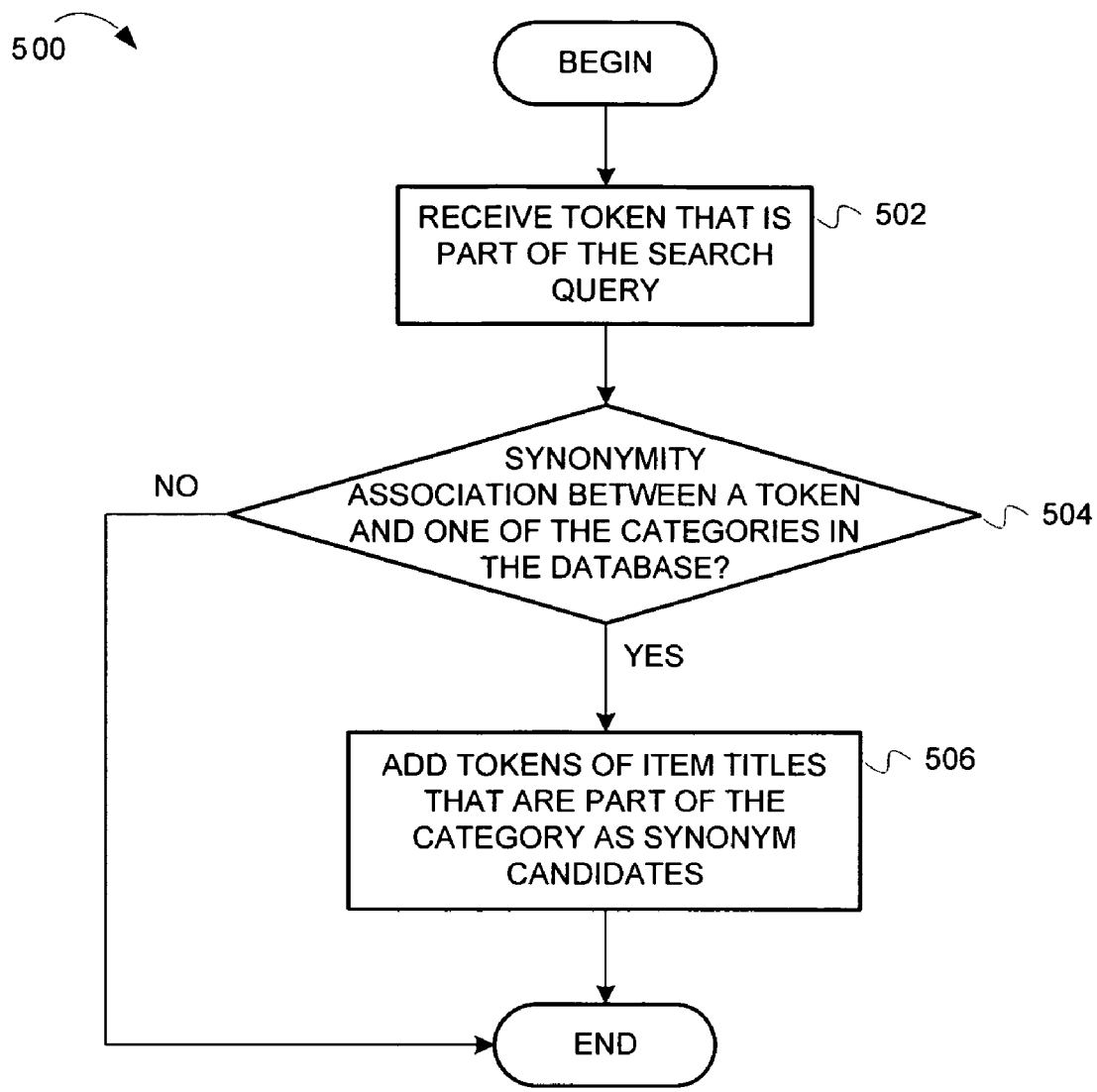
FIG. 5 illustrates a flow diagram for contextual query expansion, according to some embodiments of the invention.
Figure 7:
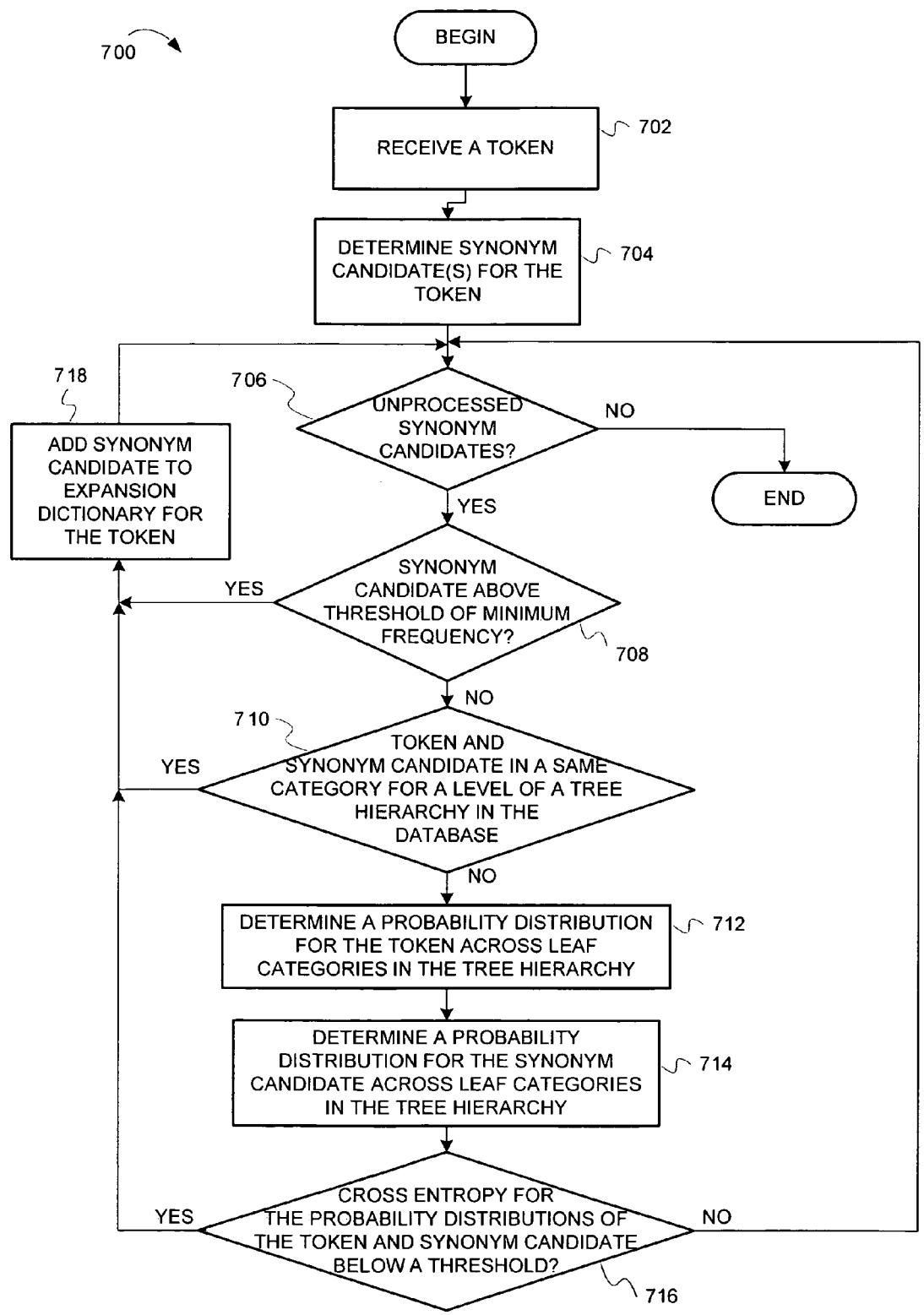
FIG. 7 illustrates a flow diagram for search query expansion that is separate from a search query operation, according to some embodiments of the invention.
Figure 8:
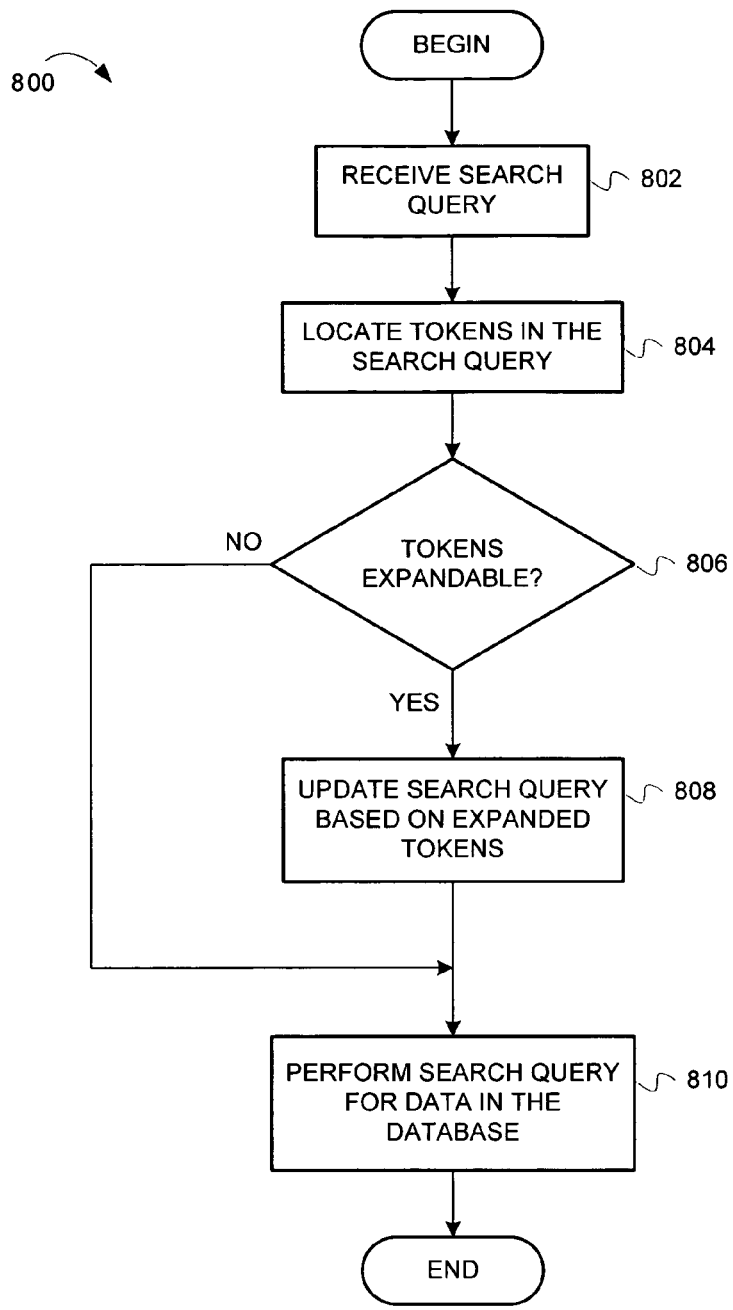
FIG. 8 illustrates a flow diagram of a search query that uses tokens that have been previously expanded, according to some embodiments of the invention.

In some embodiments, the search query expansion can be performed as part of or during the search query. For example, after a search query is received and prior to performing the search query in a database, an expansion of the query is performed. FIGS. 2 and 5 illustrate flow diagrams of operations that are executed in such order, according to some embodiments of the invention. Alternatively, the search query expansion can be performed separate from the search query. In other words, the search query expansion is performed off-line (relative to the search query). In some embodiments, the expansion can be performed on previous search queries. FIGS. 7-8 illustrate flow diagrams of operations wherein the search query expansion is separate from the search query, according to some embodiments of the invention.

FIG. 2 illustrates a flow diagram for a search query that includes a search query expansion as part of the search query, according to some embodiments of the invention. FIG. 2 illustrates operations that may be executed by the expansion module 120 and the search engine 128 (shown in FIG. 1). The flow diagram 200 commences at block 202.

At block 202, a search query, having a token, for data in a database is received. With reference to FIG. 1, the query controller module 124 may receive the search query. For example, a user may enter the search query using the web client 112. The web client 112 may forward the query to the web server 116, which forwards the query to the query controller module 124. The search query may have one or more tokens. According, in some embodiments, the operations described herein with regard to the token may be performed for one, some or all of the tokens in the search query. A token may include different words or phrases in the query.

A search query may include a sentence, phrase, single word, etc. In some embodiments, the search query is tokenized. Tokenization refers to the task of segmenting a string of text into semantically independent tokens. In some embodiments, a token is defined in terms of its semantic value and could be either a single-semantic-unit or a compound-semantic-unit. A single-semantic-unit, similar to the linguistic concept of word, is defined as a sequence of characters that symbolize and communicate a meaning without being divisible into smaller units capable of independent use. In addition, a compound-semantic-unit, similar to the linguistic concept of phrase, is defined as a sequence of single-semantic-units, such that, the final token carries an independent and different semantic value than the individual semantic-units.

Figure 3:
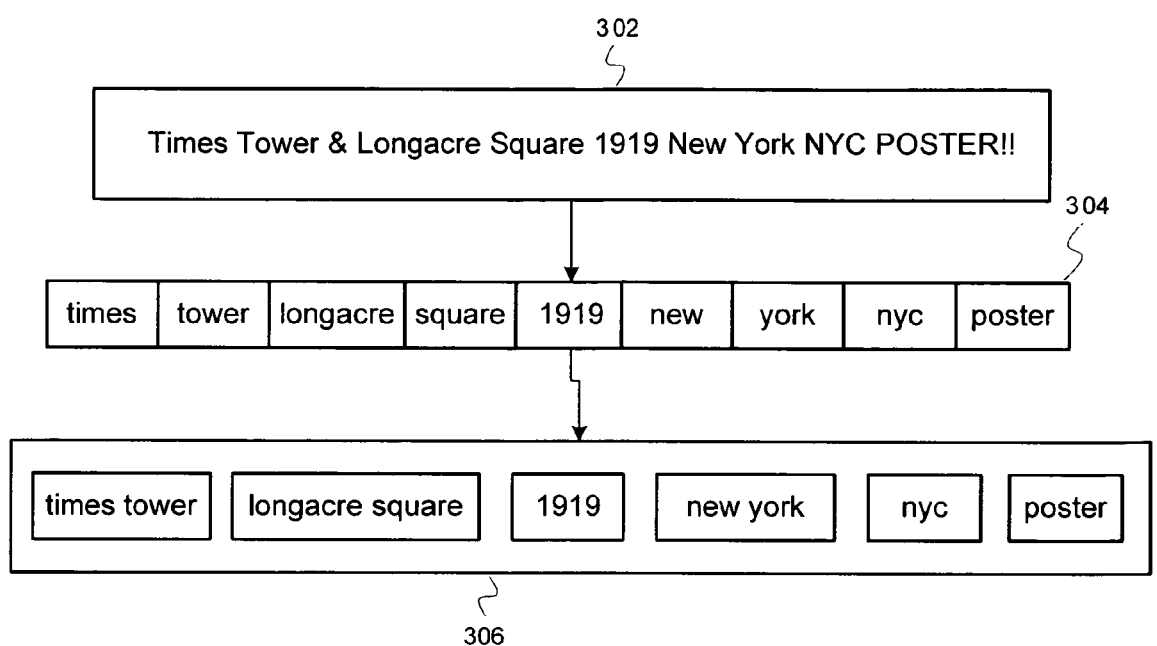
FIG. 3 illustrates tokenization of single and compound semantic-units, according to some embodiments of the invention.

In the case of Western European Languages, single-semantic-unit boundaries are usually marked by a blank space or punctuation marks. This is, however, not the case for Asian languages such as Chinese, Japanese and Thai, where there is no explicit semantic-unit delimiter such as space and punctuation marks are only seldom used. FIG. 3 illustrates tokenization of single and compound semantic-units, according to some embodiments of the invention. In particular, FIG. 3 illustrates a search query 302. The query controller module 124 separates the search query 302 into a number of single segment units 304. For example, the query controller module 124 may replace all punctuation characters with a space. The query controller module 124 may also normalize the text to be lowercase, where applicable. The query controller module 124 may also merge all sequences of spaces into one single space. The query controller module 124 may also generate a number of compound semantic units 306.

In some embodiments, the query controller module 124 may generate the compound semantic units using a dictionary-based approach. The dictionary-based approach may be forward maximum matching that starts from left to right to match the longest possible string or backward maximum matching that match from right to left for the longest possible string. In some embodiments, dictionaries are generated that cover the large vocabulary of tokens used in a given database. In some embodiments, a compound-semantic-unit extraction operation is used that uses the stream of user queries to come up with a set of most likely compound-semantic-units.

In some embodiments, the query controller module 124 may generate the compound semantic units using a statistical approach. The statistical approach is based on a statistical model which is built based on the frequency of semantic units appearing next to another, commonly known as n-grams where n is 2 to N. The token segmentation may be determined at a point where there is a lower probability for two semantic units to be next to each other, thus creating a larger semantic unit. The accuracy and complexity of the model increase as the size of the string increases. In addition, maximum run length of a compound-semantic-unit may be defined on a language basis. This approach can be extended to deal with Asian languages. For example, compound-semantic-unit for modern Chinese usage generally consists of 2 to 3 Chinese characters. In some embodiments, different combinations of approaches may be used to generate the compound semantic units. Returning to the flow diagram 200, the flow continues at block 204.

At block 204, one or more synonym candidates for the token are determined. With reference to FIG. 1, the expansion module 120 may make this determination. The query controller module 124 may forward a particular token to the expansion module 120 for processing. The subsequent operations in the flow diagram 200 may be performed for one or more of the tokens. In some embodiments, two tokens are synonyms if the search result sets returned by each token refers to a same object, concept or property within a set of items.

In some embodiments, two tokens are synonyms based on syntactical rules. In some embodiments, the syntactical rules are in the form of regular expressions to determine if the two tokens are synonyms. The syntactical rules may be language specific. For example, for German, "ü" is replaced by "ue". To illustrate, "für" is a synonym candidate for "fuer". Other examples from the German language include having "ß" replaced by "ss", "ö" being replaced by "oe", "ä" being replaced by "ae", etc.

In some embodiments, synonym candidates include the plural forms of the token. For example, a seller may just list one item at a time in an online auction. To illustrate, the seller may use the token bike in the title. On the other hand, the buyer that is searching the database for the online auction may search for bikes instead. In some embodiments, synonym candidates include different tenses. For example, for the token, buy, the synonym candidates includes buying and bought. In some embodiments, synonym candidates include gender. For example, a synonym candidate for the token waiter could be waitress. In some embodiments, synonym candidates include different forms of a token that are dependent on its role in a sentence. For example, the nominative (subject) case of the token soldier in German is Soldat. The accusative (direct object) case is Soldaten.

In some embodiments, synonym candidates relate to de-compounding of a token. For example, in languages such as German, Dutch or Swedish, tokens can be joined together to form a compound token. To illustrate in German, Blue Wale is written as Blauwal. In order to yield Blauwal as part of the search results when searching for Wal, the token is de-compounded to Blau and Wal. To illustrate in English, spiderman may be de-compounded to spider man. In some embodiments, synonym candidates relate to character transformation. In European languages, accent marks and diacriticals are used to represent intonation or completely different characters. Examples of such tokens include cámara in Spanish and fiance'e in French. Some users may not use the accent marks and diacriticals because such marks require multiple keystrokes to input on a U.S. International English keyboard. Therefore, synonym candidates may include tokens having the accent marks when the token in the search query does not include the marks and vice versa. In some embodiments, contextual query expansion is used to determine synonym candidates. A more detailed description of contextual query expansion is set forth below in the description of FIGS. 5 and 6. Returning to the flow diagram 200, the flow continues at block 206.

At block 206, a determination is made of whether there are unprocessed synonym candidates. With reference to FIG. 1, the expansion module 120 may make this determination. For example, the expansion module 120 may receive one to a number of different synonym candidates for a token. If there are no unprocessed synonym candidates, the flow continues at block 220, which is described in more detail below. Otherwise, the flow continues at block 208.

At block 208, a determination is made of whether the synonym candidate is above a threshold of minimum frequency in a number of data strings that represent data in the database and/or a number of search queries. With reference to FIG. 1, the expansion module 120 may make this determination. The data strings may be item titles. For example, if the database is for storage of items being bought and sold, the data string may be the title that a buyer entered for a given item. Accordingly, the expansion module 120 may determine if the synonym candidate is found in at least a threshold number of item titles in the database. Moreover, a history of the search queries may be stored in a machine-readable medium (such as the data store 130). The expansion module 120 may determine if the synonym candidate is found in at least a threshold number of these search queries. The expansion module 120 may check the threshold for both the data strings that represent the data and the search queries. Alternatively, the expansion module 120 may check either the data strings that represent the data or the search queries. In some embodiments, the threshold is 15, 20, 25, 30, 100, etc. Using this threshold may eliminate expansions that are not really used in item titles or queries. Accordingly, there is a higher likelihood that the synonym candidate is actually being used for searches. If the synonym candidate is above a minimum threshold frequency, the flow continues at block 218, which is described in more detail below. Otherwise, the flow continues at block 210.

Figure 4:
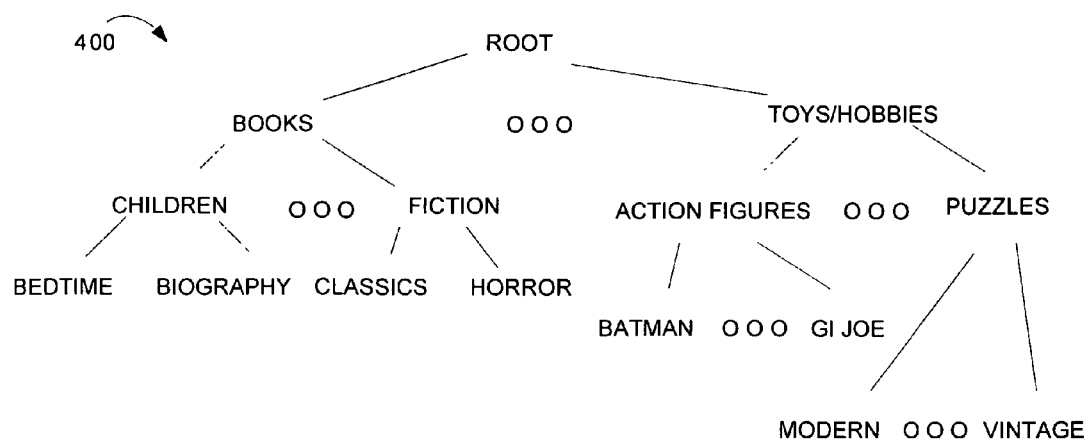
FIG. 4 is a tree hierarchy for storage of data in a database, according to some embodiments of the invention.

At block 210, a determination is made of whether the token and the synonym candidate are in a same category for a level of a tree hierarchy in the database. With reference to FIG. 1, the expansion module 120 may make this determination. To illustrate, FIG. 4 is a tree hierarchy for storage of data in a database, according to some embodiments of the invention. FIG. 4 illustrates a tree hierarchy 400 of a database for online auctioning. The tree hierarchy includes a root. The children nodes of the root include books and toys/hobbies (which is level one). The children nodes of books include children and fiction (which is level two). The children nodes of toys/hobbies include action figures and puzzles (which is level two). The children nodes of children include bedtime and biography (which is level three—leaf categories of the tree hierarchy). The children nodes of fiction include classics and horror (which is level three—leaf categories of the tree hierarchy). The children nodes of action figures include batman and GI Joe (which is level three—leaf categories of the tree hierarchy). The children nodes of puzzles include modern and vintage (which is level three—leaf categories of the tree hierarchy). The items of data are stored in one of the leaf categories.

In some embodiments, the expansion module 120 makes this determination based on level one. The expansion module 120 may determine the level one category with the largest item frequency for the token. The expansion module 120 may also determine the level one category with the largest item frequency for the synonym candidate. For example, if the token is "spiderman", the expansion module 120 determines which of the level one categories have the most items stored below (in one of its leaf categories) with the token "spiderman." Similarly, if the synonym candidate is "spider man", the expansion module 120 determines which of the level one categories have the most items stored below (in one of the leaf categories) with the token "spider man." The expansion module 120 then determines whether these level one categories for the token and the synonym candidate are the same. Therefore, if the token and the synonym candidate have the same level one category (as described), the synonym candidate may be considered a synonym of the token. If the token and the synonym candidate are part of a same category for a level in the tree hierarchy, the flow continues at block 218, which is described in more detail below. Otherwise, the flow continues at block 212.

At block 212, a probability distribution for the token across leaf categories in tree hierarchy is determined. With reference to FIG. 1, the expansion module 120 may make this determination. This operation may identify synonymity among token pairs, which accounts for the usage of tokens across the whole database. In particular, the usage distribution of a token across the whole set of leaf categories is taken into account. In some embodiments, two tokens are semantically equivalent if the two tokens are used in the same sense or set of senses. Therefore, in some embodiments, this operation identifies each leaf category in the category structure of the tree hierarchy where a token occurs as a different sense for that particular token. Accordingly, in some embodiments, the expansion module 120 may make this determination based on probability distributions. Let LC=$\{l_1, l_2, \ldots, l_n\}$ be the set of leaf categories. Let the probability (Pw, $l_i$) of a token (w) being used in a leaf category $l_i$ for i=1, 2, . . . , n, where n is the number of leaf categories. (Pw, $l_i$) is estimated as follows:

$$P(w, l_i) = \frac{if_{w,l_i} + \mu P(w)}{if_w + \mu} \quad \text{if } if_{w,l_i} > 0$$

$$P(w, l_i) = \left(\frac{\mu}{if_w + \mu}\right) P(w) \quad \text{otherwise}$$

$$P(w) = \frac{if_w}{\sum_w if_w}$$

where $if_{w, l_i}$ is the item frequency of the token, w, in category $l_i$, $if_w$ is the frequency of token w in the database, P(w) is the global probability of token, w, and W is the complete vocabulary of words. Therefore, the probability distribution represents the set of senses for a particular token across the set of leaf categories. This estimation of probabilities also includes a smoothing component, which assigns non-zero probabilities to token-category combinations. In particular, µ is set to one for probability estimations. The flow continues at block 214.

At block 214, a probability distribution for the synonym candidate across leaf categories in tree hierarchy is determined. With reference to FIG. 1, the expansion module 120 may make this determination. The expansion module 120 may make this determination based on the formulas described above at block 212. The flow continues at block 216.

At block 216, a determination is made of whether the cross entropy for the probability distributions for the token and the synonym candidate is below a threshold. With reference to FIG. 1, the expansion module 120 may make this determination. In some embodiments, given two probability distributions functions $\theta_{w_1}$ and $\theta_{w_2}$ for a pair of tokens $w_1$, $w_2$ across the set of leaf categories, LC, the expansion module 120 may determine the cross entropy among the distributions using the KL-divergence measure (as follows):

$$KL(\Theta_{w_1} \| \Theta_{w_2}) = \sum_i p(w_1, l_i) \log \frac{p(w_1, l_i)}{p(w_2, l_i)},$$

where i=1, 2, . . . , n. This cross entropy is a measure of similarity between the two tokens, and may, thus, be a measure of synonymity between the two tokens, $w_1$ and $w_2$. In some embodiments, the threshold is 1, 5, 10, 20, etc. Therefore, if the KL-divergence is below the threshold, the synonym candidate is considered a synonym of the token. If the cross entropy is not below a threshold, the flow continues at block 206. Otherwise, the flow continues at block 218.

At block 218, the synonym candidate is added to the search query. With reference to FIG. 1, the expansion module 120 adds the synonym candidate to the search query. The flow continues at block 206.

At block 220 (if there are no more unprocessed synonym candidates), the search query is used to perform a search for data in the database. With reference to FIG. 1, the search engine 128 performs the search for data in the data store 130. The expansion module 120 may forward the search query to the search engine 128. The search engine 128 may return the result of the search query to the query controller module 124, which returns the result to the programmatic client 110 or the web client 112, through the API server 114 or the web server 116, respectively. The operations of the flow diagram 200 are complete.

In some embodiments, if the search query is expanded, the user that entered the search query is allowed to review the expanded search query prior to the search being executed. While described such that any one of the determinations at block 208, 210 or 216 may cause the synonym candidate to be added to the search query, in some embodiments, a "yes" result for all such determinations is required prior to the synonym candidate being added to the search query. Alternatively, a "yes" result for less than all of the determinations is required (such as 206 and 208, 206 and 210, etc.).

A more detailed description of operations that may be performed for determining synonym candidates is now described. With reference to FIG. 2, the operations now described may be in addition to or an alternative to the operations at block 204. The operations at block 204 are described in reference to determining synonym candidates based on different plural forms, tense forms, etc. for a given token. The operations now described may determine synonym candidates for a token based on a category node in a tree of categories. In particular, FIG. 5 illustrates a flow diagram for contextual query expansion, according to some embodiments of the invention. FIG. 5 illustrates operations that may be executed by the expansion module 120 (shown in FIG. 1). The flow diagram 500 commences at block 502.

At block 502, a token that is part of the search query is received. With reference to FIG. 1, the expansion module 120 may receive the token being processed. For example, the expansion module 120 may receive the token after the tokenization of the search query (as described above). The flow continues at block 504.

At block 504, a determination is made of whether there is a synonymity association between the token and one of the categories in the database. With reference to FIG. 1, the expansion module 120 may make this determination. To illustrates, a search query may be for data in a database related to online auctioning (buyer and sellers). In a situation of users not familiar with the searching in such a database, buyers tend to type their queries in terms of a concept or an idea, instead of the specific object of interest. For example, buyers may type search queries such as dvd, restaurant equipment, used cars, etc. In some situations, a user may not include these specific tokens in their item title. Table 1 below illustrates some examples of relating a token to a category in the database:

TABLE 1

| Token | Category Expansion |
|---|---|
| Dvd | DVD & Movies > DVDs |
| Books | Books |
| Cars | eBay Motors > Passenger Vehicles |
| restaurant equipment | Business & Industrial > Food Service Retail |

As shown, there is a synonymity association between the token dvd and the category D VDs. There is a synonymity association between the token book and the category Books. There is a synonymity association between the token restaurant equipment and the category Food Service Retail. A more detailed description of the determination of whether there is a synonymity association between the token and one of the categories is described in more detail below in a flow diagram 600 of FIG. 6. If there is no synonymity association, the operations of the flow diagram 500 are complete. Otherwise, the flow continues at block 506.

At block 506, tokens in the item titles that are part of the category with the synonymity association with the token are added as synonym candidates. With reference to FIG. 1, the expansion module 120 may perform this operation. These synonym candidates may be processed as set forth above in the description of the flow diagram 200 of FIG. 2.

Figure 6:
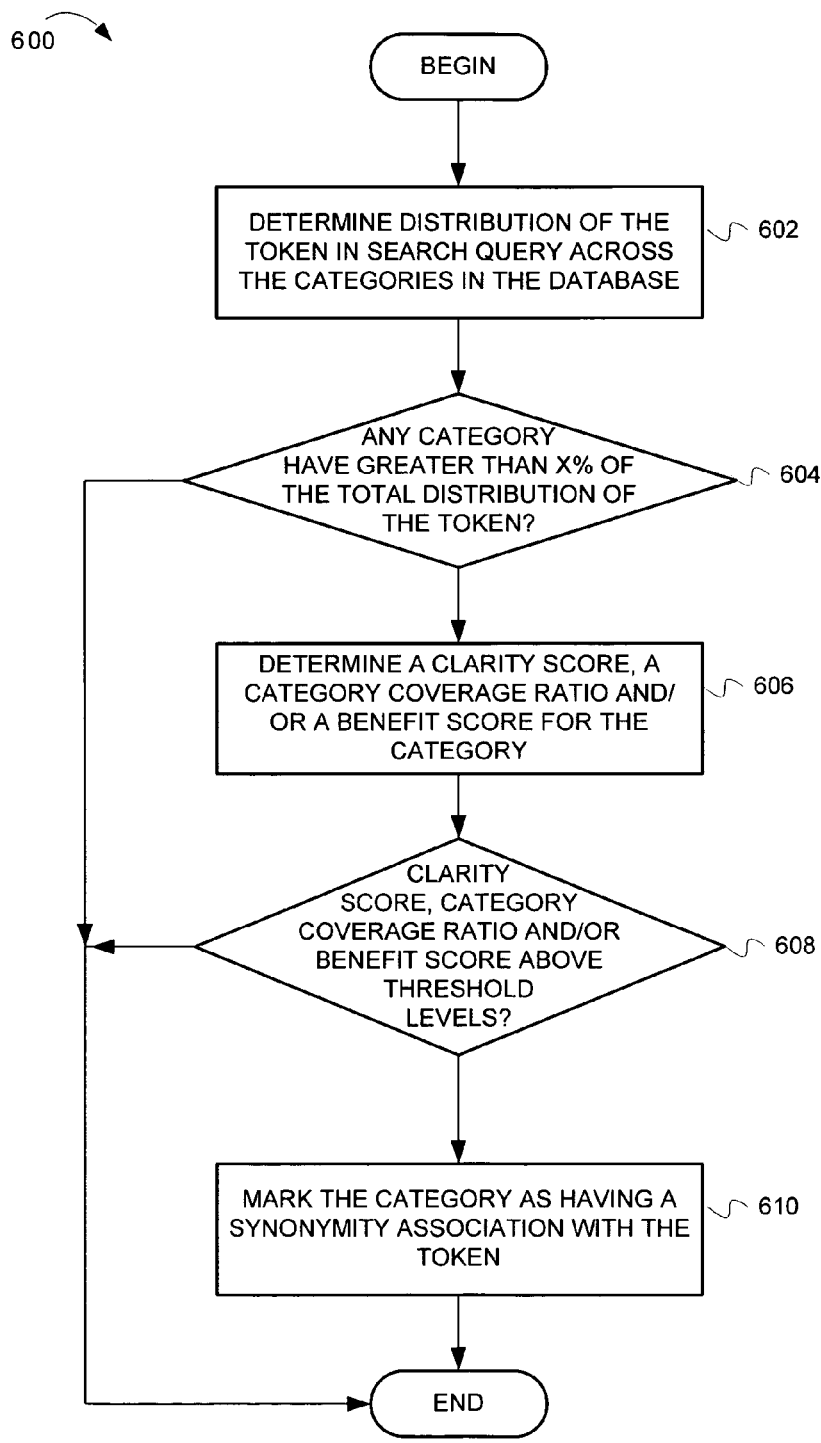
FIG. 6 illustrates a flow diagram for determining a synonymity association between the token and one of the categories in the database, according to some embodiments of the invention.

A more detailed description of operations that may be performed for determining whether there is a synonymity association between the token and one of the categories in the database is now described. With reference to FIG. 5, the operations now described may be part of the operations at block 504. In particular, FIG. 6 illustrates a flow diagram for determining a synonymity association between the token and one of the categories in the database, according to some embodiments of the invention. FIG. 6 illustrates operations that may be executed by the expansion module 120 (shown in FIG. 1). The flow diagram 600 commences at block 602.

At block 602, a distribution of the token in the search query across the categories in the database is determined. With reference to FIG. 1, the expansion module 120 may determine this distribution. In some embodiments, the expansion module 120 may determine the relationship between the search queries (that includes the token) previously used to search the database and the item selected based on the result returned to the user. In particular, the user may input a search query that may return a number of results (which can be individual items stored in the database). The user may select one the items. The query controller module 124 may store this relationship between the tokens in the previous search queries and the individual items selected. The expansion module 120 may retrieve this data for the particular token being processed. The expansion module 120 may determine a histogram of the leaf categories in the database for this token. Returning to FIG. 4 to help illustrate, for the leaf category "bedtime", the expansion module 120 determines the number of items stored in this leaf category that were selected by the user after a search query by the user (having this token). For example, for X number of search queries (that include the token), the user may have selected a first item under the "bedtime" leaf category. For Y number of search queries (that have the token), the user may have selected a second item under the "bedtime" leaf category. Accordingly, the "bedtime" leaf category would have a X+Y value for this token. The expansion module 120 may make the determination for each of the leaf categories in the database.

The expansion module 120 may push these values up the tree hierarchy. For example, if the "bedtime" leaf category has a value of 50 and the "biography" leaf category has a value of 100, the "children" category has a value of 150. The expansion module 120 may push these values up to the first level of the tree hierarchy. Returning to the flow diagram 600, the flow continues at block 604.

At block 604, a determination is made of whether any category (not including the root) has greater than X% of the total distribution of the token across the tree hierarchy. With reference to FIG. 1, the expansion module 120 may make this determination. The value of X may vary based on a number of criteria (such as the type of data stored therein, the size of the database, etc.). In some embodiments, the value of X may be 70, 80, 90, 95, etc. The expansion module 120 may select the lowest category in the tree hierarchy have greater than X%. The category may be at any level. If no category has greater than X%, the operations of the flow diagram 600 are complete. Otherwise, the flow continues at block 606. In other words, if no category has greater than X%, no synonym candidates are added based on the relationship between the token and the categories (as described above).

At block 606, a clarity score, a category coverage ratio and/or a benefit score (for the selected category from block 604) is determined. With reference to FIG. 1, the expansion module 120 may make determine these scores/ratios. In some embodiments, the expansion module 120 may determine one, some or all of these scores/ratios. The clarity score equals the number of items in a category that contain the token divided by the total number of items containing the token across the entire database. The category coverage ratio equals the number of search results in the selected category divided by the total number of items in that category. The benefit score equals the number of items that are being added as possible synonym candidates (those items that are part of the selected category) divided by the number of search queries across the database. The flow continues at block 608.

At block 608, a determination is made of whether the clarity score, the category coverage ratio and/or the benefit score are above threshold levels. In some embodiments, the expansion module 120 may make this determination. The threshold levels for the clarity score, the category coverage ratio and the benefit score may vary based on a number of criteria (such as the type of data stored therein, the size of the database, etc.). The expansion module 120 may determine a threshold level for one, some or all of the clarity score, the category coverage ratio and the benefit score. Therefore, in some embodiments, the clarity score, the category coverage ratio and the benefit score need to exceed their associated threshold level. Alternatively, one or some of the scores/ratios need to exceed their associated threshold level. If the clarity score, the category coverage ratio and/or the benefit score are not above associated threshold levels, the operations of the flow diagram 600 are complete. Otherwise, the flow continues at block 610.

At block 610, the selected category is marked as having a synonymity association with the token. With reference to FIG. 1, the expansion module 120 may mark the selected category.

Flow diagrams of operations wherein the search query expansion is separate from the search query, according to some embodiments of the invention, are now described. In particular, FIG. 7 illustrates the operations for the expansion, while FIG. 8 illustrates the operations of using expansions.

FIG. 7 illustrates a flow diagram for search query expansion that is separate from a search query operation, according to some embodiments of the invention. FIG. 7 illustrates operations that may be executed by the expansion module 120 and the search engine 128 (shown in FIG. 1). The flow diagram 200 commences at block 202.

At block 702, a token is received. With reference to FIG. 1, the expansion module 120 may receive the token. For example, the expansion module 120 may retrieve a token from a list of tokens that may have been part of previous search queries. For example, a history of the previous search queries may be stored in the data store 130. Accordingly, the expansion module 120 may perform tokenization of a search query prior to this operation at block 702 (as described at block 202 of FIG. 2 above). The flow continues at block 204.

At block 704, one or more synonym candidates for the token are determined. With reference to FIG. 1, the expansion module 120 may make this determination. The operations by the expansion module 120 for making this determination are described above at block 204 of FIG. 2. The flow continues at block 206.

At block 706, a determination is made of whether there are unprocessed synonym candidates. With reference to FIG. 1, the expansion module 120 may make this determination. For example, the expansion module 120 may receive one to a number of different synonym candidates for a token. If there are no unprocessed synonym candidates, the operations of the flow diagram 700 are complete. Otherwise, the flow continues at block 708.

At block 708, a determination is made of whether the synonym candidate is above a threshold of minimum frequency in a number of data strings that represent data in the database and/or a number of search queries. With reference to FIG. 1, the expansion module 120 may make this determination. The operations by the expansion module 120 for making this determination are described above at block 208 of FIG. 2. If the synonym candidate is above a minimum threshold frequency, the flow continues at block 718, which is described in more detail below. Otherwise, the flow continues at block 710.

At block 710, a determination is made of whether the token and the synonym candidate are in a same category for a level of a tree hierarchy in the database. With reference to FIG. 1, the expansion module 120 may make this determination. The operations by the expansion module 120 for making this determination are described above at block 210 of FIG. 2. If the token and the synonym candidate are part of a same category for a level in the tree hierarchy, the flow continues at block 718, which is described in more detail below. Otherwise, the flow continues at block 712.

At block 712, a probability distribution for the token across leaf categories in tree hierarchy is determined. With reference to FIG. 1, the expansion module 120 may make this determination. The operations by the expansion module 120 for making this determination are described above at block 212 of FIG. 2. The flow continues at block 714.

At block 714, a probability distribution for the synonym candidate across leaf categories in tree hierarchy is determined. With reference to FIG. 1, the expansion module 120 may make this determination. The expansion module 120 may make this determination based on the formulas described above at block 212 of FIG. 2. The flow continues at block 716.

At block 716, a determination is made of whether the cross entropy for the probability distributions for the token and the synonym candidate is below a threshold. With reference to FIG. 1, the expansion module 120 may make this determination. The operations by the expansion module 120 for making this determination are described above at block 216 of FIG. 2. If the cross entropy is not below a threshold, the flow continues at block 706. Otherwise, the flow continues at block 718.

At block 718, the synonym candidate is added to the expansion dictionary for the token. With reference to FIG. 1, the expansion module 120 may add the synonym candidate to the expansion dictionary for the token. In particular, the expansion module 120 may update a data structure (such as a table) in the data store 130 to associate the synonym candidate with the token. This synonym candidate may be subsequently used to expand a search query having this token (as described in more detail below in the flow diagram 800 of FIG. 8). The flow continues at block 706. The operations of the flow diagram 700 may be performed for any number of tokens and may be performed independent of a search query operation.

FIG. 8 illustrates a flow diagram of a search query that uses tokens that have been previously expanded, according to some embodiments of the invention. FIG. 8 illustrates operations that may be executed by the query controller module 124 and the search engine 128 (shown in FIG. 1). The flow diagram 800 commences at block 802.

At block 802, a search query, having a token, for data in a database is received. With reference to FIG. 1, the query controller module 124 may receive the search query. For example, a user may enter the search query using the web client 112. The web client 112 may forward the query to the web server 116, which forwards the query to the query controller module 124. The search query may have one or more tokens. According, in some embodiments, the operations described herein with regard to the token may be performed for one, some or all of the tokens in the search query. The flow continues at block 804.

At block 804, tokens in the search query are located. With reference to FIG. 1, the query controller module 124 may locate the tokens in the search query. The operations by the query controller module 124 for locating the tokens in the search query are described above at block 202 of FIG. 2. The flow continues at block 806.

At block 806, a determination is made of whether any of the tokens are expandable. With reference to FIG. 1, the query controller module 124 may make this determination. In particular, the query controller module 124 may determine whether the tokens are expandable based on the expansion dictionary. The query controller module 124 may query the data store 130 to determine whether any of the tokens include associated synonyms. If so, the tokens are expandable. If the tokens are not expanded, the flow continues at block 810 (which is described in more detail below). Otherwise, the flow continues at block 808.

At block 808, the search query is updated based on the expanded tokens. With reference to FIG. 1, the query controller module 124 may update the search query. The query controller module 124 may add the associated synonyms to the search query. In some embodiments, the associated synonyms are added as an alternative to the token (using an OR operation). The flow continues at block 810.

At block 810, a search query is performed for data in the database. With reference to FIG. 1, the search engine 128 performs the search for data in the data store 130. The query controller module 124 may forward the search query to the search engine 128. The search engine 128 may return the result of the search query to the query controller module 124, which returns the result to the programmatic client 110 or the web client 112, through the API server 114 or the web server 116, respectively. The operations of the flow diagram 200 are complete. In some embodiments, if the search query is expanded, the user that entered the search query is allowed to review the expanded search query prior to the search being executed.

Example Computer Apparatus

Figure 9:
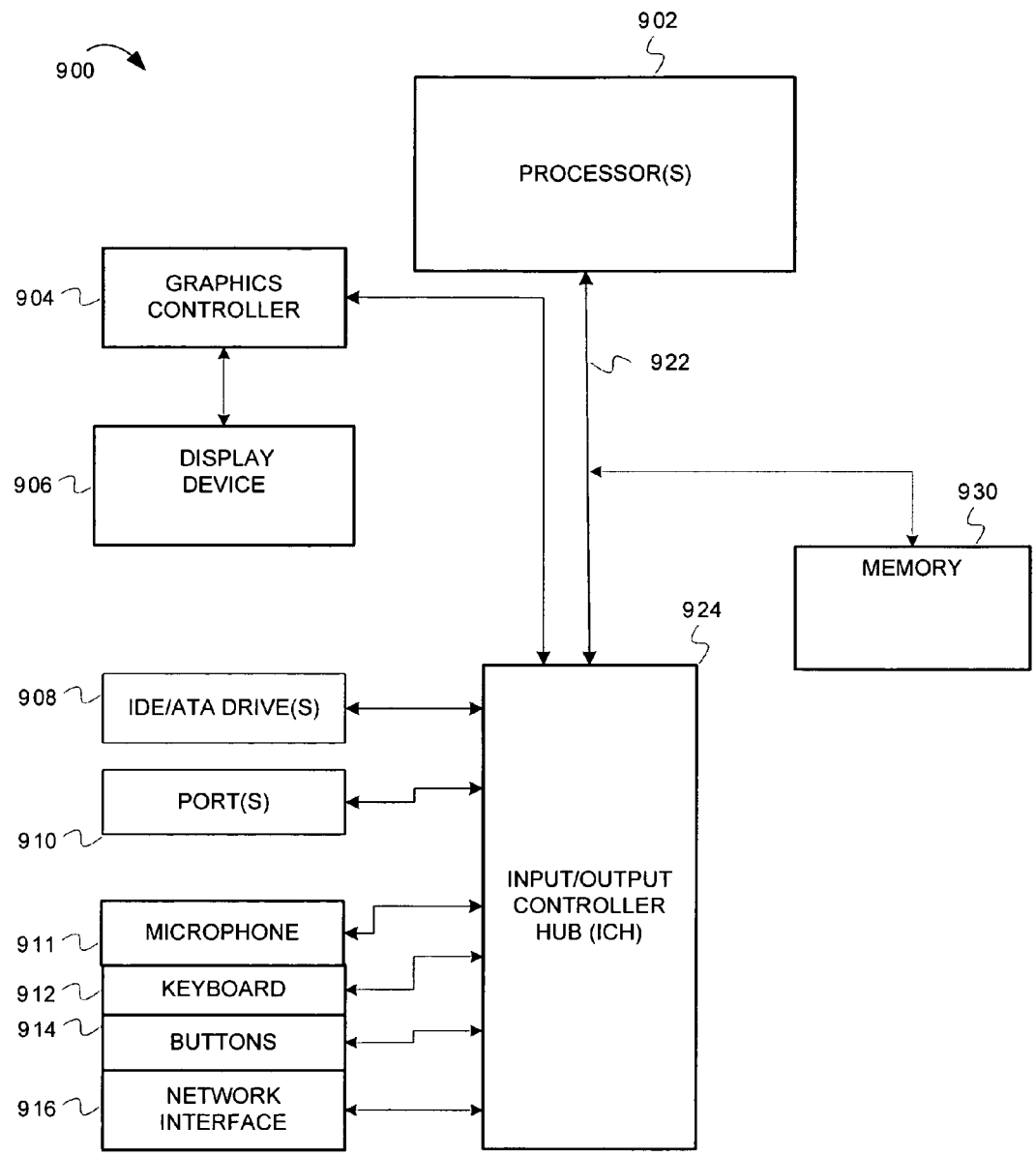
FIG. 9 illustrates parts of a computer apparatus, according to some embodiments of the invention.

FIG. 9 illustrates parts of a computer apparatus, according to some embodiments of the invention. In particular, a computer apparatus 900 shown in FIG. 9 may be representative of an architecture within the client machines 104/106, the API server, the web server 116, the application server(s) 118 and the search back end server(s) 126 (shown in FIG. 1). The computer apparatus 900 comprises processor(s) 902.

The computer apparatus 900 also includes a volatile memory 930, processor bus 922, and an Input/Output (I/O) controller hub (ICH) 924. The processor(s) 902, the volatile memory 930, and the ICH 924 are coupled to the processor bus 922. The processor(s) 902 may comprise any suitable processor architecture. The computer apparatus 900 may comprise one, two, three, or more processors, any of which may execute a set of instructions in accordance with embodiments of the invention. The processor(s) 902 may be different types of processors. For example, a first processor may be a general purpose processor, while a second processor may be a digital signal processor for decoding and encoding audio data, video data, etc.

The memory 930 may be representative of volatile and/or nonvolatile memory that stores data and/or instructions, and may comprise any suitable memory, such as a dynamic random access memory (DRAM), etc. The nonvolatile memory may be Static Random Access Memory (SRAM), flash memory, etc. The nonvolatile memory may also be Programmable ROM (PROM), Erasable PROM (EPROM), Electrically Erasable PROM (EEPROM), etc.

The computer apparatus 900 may include the modules shown in FIG. 1 (e.g., the expansion module 130 for the application server(s) 118). These modules may be representative of hardware, firmware or a combination thereof. These modules may be software instructions that reside in the memory 930 and/or one of the IDE/ATA drives 908, which may be executed by the processor(s) 902.

A graphics controller 904 controls the display of information on a display device 906. The ICH 924 provides an interface to I/O devices or peripheral components for the computer apparatus 900. The ICH 924 may comprise any suitable interface controller to provide for any suitable communication link to the processor(s) 902, the volatile memory 930 and/or to any suitable device or component in communication with the ICH 924. In some embodiments, the ICH 924 provides suitable arbitration and buffering for each interface.

For some embodiments of the invention, the ICH 924 provides an interface to a secondary storage 908 (which may be any type of nonvolatile data storage), such as a hard disk drive (HDD) or compact disc read only memory (CD ROM) drive, or to suitable universal serial bus (USB) devices through one or more USB ports. The secondary storage 908 may be read only, read/write, etc.

For some embodiments, the ICH 924 also provides an interface different user input devices (a microphone 911, a keyboard 912, buttons 914, etc.). For some embodiments, the ICH 924 also provides a network interface 920 though which the computer apparatus 900 may communicate with other computers and/or devices. The ICH 924 may provide an interface to any number of ports 910. The ports 910 may be used to provide different input/output. For example, one or more ports 910 may be coupled to speakers for audio output.

General

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A number of figures show block diagrams of systems and apparatus for expansion of database search queries, in accordance with some embodiments of the invention. A number of figures show flow diagrams illustrating operations for expansion of database search queries, in accordance with some embodiments of the invention. The operations of the flow diagrams are described with references to the systems/apparatus shown in the block diagrams. However, it should be understood that the operations of the flow diagram could be performed by embodiments of systems and apparatus other than those discussed with reference to the block diagrams, and embodiments discussed with reference to the systems/apparatus could perform operations different than those discussed with reference to the flow diagrams.

Some or all of the operations described herein may be performed by hardware, firmware, software or a combination thereof. For example, the operations of the different controllers as described herein may be performed by hardware, firmware, software or a combination thereof. Upon reading and comprehending the content of this disclosure, one of ordinary skill in the art will understand the manner in which a software program can be launched from a machine-readable medium in a computer-based system to execute the functions defined in the software program. One of ordinary skill in the art will further understand the various programming languages that may be employed to create one or more software programs designed to implement and perform the methods disclosed herein. The programs may be structured in an object-oriented format using an object-oriented language such as Java or C++. Alternatively, the programs can be structured in a procedure-orientated format using a procedural language, such as assembly or C. The software components may communicate using any of a number of mechanisms well-known to those skilled in the art, such as application program interfaces or inter-process communication techniques, including remote procedure calls. The teachings of various embodiments are not limited to any particular programming language or environment.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method comprising:
executing instructions stored on a machine-readable medium readable by a processor which when executed cause the processor to perform operations comprising:
receiving a search query including a token, the search query to be performed on data in a database stored on the machine-readable medium or a different machine-readable medium, the database including items of data that are represented by data strings;
determining a synonym candidate for the token;
adding the synonym candidate as a synonym for the token into an expansion dictionary in response to a determination that the number of data strings having the synonym candidate exceeds a threshold and a determination that the synonym candidate and the token are in a same category for a level of a tree hierarchy in the database, the tree hierarchy including a plurality of nodes having parent-child relationships;
expanding the search query to include the synonym to form an expanded search query; and
performing a search, using the expanded search query, for data in the database.

2. The method of claim 1, wherein the operations comprise:
receiving a search query having the token for data in the database from a requester; and
returning a result of the search to the requester.

3. The method of claim 2, wherein the operations comprise:
returning the expanded search query to the requester; and
receiving an approval of the expanded search query from the requester, prior to performing the search using the expanded search query.

4. The method of claim 1, wherein adding the synonym candidate as the synonym for the token into the expansion dictionary is in response to a determination that a number of search queries into the database having the synonym candidate exceeds a threshold.

5. The method of claim 1, wherein determining the synonym candidate for the token comprises determining a different form of the token based on a role in a sentence for the different form in comparison to the role of the token in the sentence.

6. The method of claim 1, wherein determining the synonym candidate for the token comprises determining a plural form of a singular form of the token.

7. The method of claim 1, wherein the threshold is 15.

8. A machine-readable medium including instructions, which when executed by a machine cause the machine to perform operations comprising:
   receiving a search query including a token, the search query to be performed on data in a database stored on the machine-readable medium or a different machine-readable medium, the database including items of data that are represented by data strings;
   determining a synonym candidate for the token;
   adding the synonym candidate as a synonym for the token into an expansion dictionary in response to a determination that the number of data strings having the synonym candidate exceeds a threshold and a determination that the synonym candidate and the token are in a same category for a level of a tree hierarchy in the database, the tree hierarchy including a plurality of nodes having parent-child relationships;
   expanding the search query to include the synonym to form an expanded search query; and
   performing a search, using the expanded search query, for data in the database.

9. The machine-readable medium of claim 8, further comprising:
   receiving a search query having the token for data in the database from a requester; and
   returning a result of the search to the requester.

10. The machine-readable medium of claim 9, further comprising:
    returning the expanded search query to the requester; and
    receiving an approval of the expanded search query from the requester, prior to performing the search using the expanded search query.

11. The machine-readable medium of claim 8, wherein adding the synonym candidate as the synonym for the token into the expansion dictionary is in response to a determination that a number of search queries into the database having the synonym candidate exceeds a threshold.

12. The machine-readable medium of claim 8, wherein determining the synonym candidate for the token comprises determining a different form of the token based on a role in a sentence for the different form in comparison to the role of the token in the sentence.

13. The machine-readable medium of claim 8, wherein determining the synonym candidate for the token comprises determining a plural form of a singular form of the token.

14. The machine-readable medium of claim 8, wherein the threshold is 15.

* * * * *

UNITED STATES PATENT AND TRADEMARK OFFICE
CERTIFICATE OF CORRECTION

PATENT NO.         : 8,195,683 B2                                                Page 1 of 2
APPLICATION NO.    : 11/363679
DATED              : June 5, 2012
INVENTOR(S)        : Alvaro Bolivar It is certified that error appears in the above-identified patent and that said Letters Patent is hereby corrected as shown below:

Title page, Item (56) under "Other Publications", in column 2, line 19, after "11/238,643", insert --,--, therefor Title page, Item (56) under "Other Publications", in column 2, line 3, delete "200780015544.2,Office", insert --200780015544.2, Office--, therefor Title page, Item (56) under "Other Publications", in column 2, line 4, delete "Mailed" and insert --mailed--, therefor Title page, Item (56) under "Other Publications", in column 2, line 27, delete "200780015514.2—Office", and insert --200780015514.2, Office--, therefor Title page, Item (56) under "Other Publications", in column 2, line 31, after "200780015514.2", delete ".", and insert --,--, therefor In column 3, line 36, delete "According," and insert --Accordingly,--, therefor In column 4, line 6, after "may", delete "be", therefor In column 6, line 52-62, delete "$P(w) = \frac{if_w}{\sum_{w'} n^{if_{w'}}}$", and insert --$P(w) = \frac{if_w}{\sum_w w^{if_w}}$--, therefor In column 7, line 17, delete "$\theta_{w1}$ and $\theta_{w2}$", and insert --$\Theta_{w1}$ and $\Theta_{w2}$--, therefor In column 8, line 16-17, delete "To illustrates" and insert --To illustrate--, therefor In column 8, line 37, delete "D VDs", and insert --DVDs--, therefor Signed and Sealed this
Eleventh Day of September, 2012

David J. Kappos
*Director of the United States Patent and Trademark Office*

CERTIFICATE OF CORRECTION (continued)
U.S. Pat. No. 8,195,683 B2

In column 9, line 6, delete "one the", and insert --one of the--, therefor

In column 9, line 50, after "may", delete "make", therefor

In column 11, line 50, delete "According," and insert --Accordingly,--, therefor